United States Patent
Harata et al.

(10) Patent No.: US 7,994,663 B2
(45) Date of Patent: Aug. 9, 2011

(54) MOTOR (75) Inventors: Takaji Harata, Nagano (JP); Makoto Fujishima, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 12/627,213

(22) Filed: Nov. 30, 2009

(65) Prior Publication Data
US 2010/0133928 A1    Jun. 3, 2010

(30) Foreign Application Priority Data
Nov. 28, 2008 (JP) ................................ 2008-304995

(51) Int. Cl.
*H02K 5/10* (2006.01)
(52) U.S. Cl. ....................................... 310/43; 310/67 R
(58) Field of Classification Search ................... 310/43, 310/67 R, 90, 260
See application file for complete search history.

(56) References Cited

U.S. PATENT DOCUMENTS

| | | | |
|---|---|---|---|
| 4,129,796 A * | 12/1978 | Papst | 310/43 |
| 6,359,354 B1 * | 3/2002 | Watanabe et al. | 310/87 |
| 6,762,521 B2 * | 7/2004 | Peter et al. | 310/89 |
| 7,012,346 B2 * | 3/2006 | Hoffman et al. | 310/43 |

FOREIGN PATENT DOCUMENTS

JP        10-108404 A    4/1998

* cited by examiner

*Primary Examiner* — Dang D Le
(74) *Attorney, Agent, or Firm* — Cantor Colburn LLP (57) ABSTRACT

A motor may include a motor base plate, a bearing holder provided with a through hole whose both ends hold bearings and vertically disposed with respect to the motor base plate, a stator provided with a center hole and fixed to an outer peripheral face of the bearing holder, and a rotor having a shaft supported by the bearings, a rotor case fixed to the shaft, and a magnet fixed on an inner peripheral face of the rotor case. The bearing holder may be provided with a stepped part, protruded toward a radial direction. The stator may be provided with a first resin block structured so that an end face on a motor base plate side of the stator core is molded with resin to cover a coil wound around the stator core, and inner peripheral faces of the stator core and the first resin block structure the center hole, and the center hole of the stator is press-fitted and fixed to the bearing holder until an end face of the first resin block is abutted with the stepped part.

11 Claims, 5 Drawing Sheets

MOTOR

CROSS REFERENCE TO RELATED APPLICATION

The present invention claims priority under 35 U.S.C. §119 to Japanese Application No. 2008-304995 filed Nov. 28, 2008, the entire contents of which are incorporated herein by reference.

FIELD OF THE INVENTION

An embodiment of the present invention may relate to a motor in which bearings for supporting a rotor is held by a bearing holder and a stator is fixed to the bearing holder.

BACKGROUND OF THE INVENTION

Figure 6:
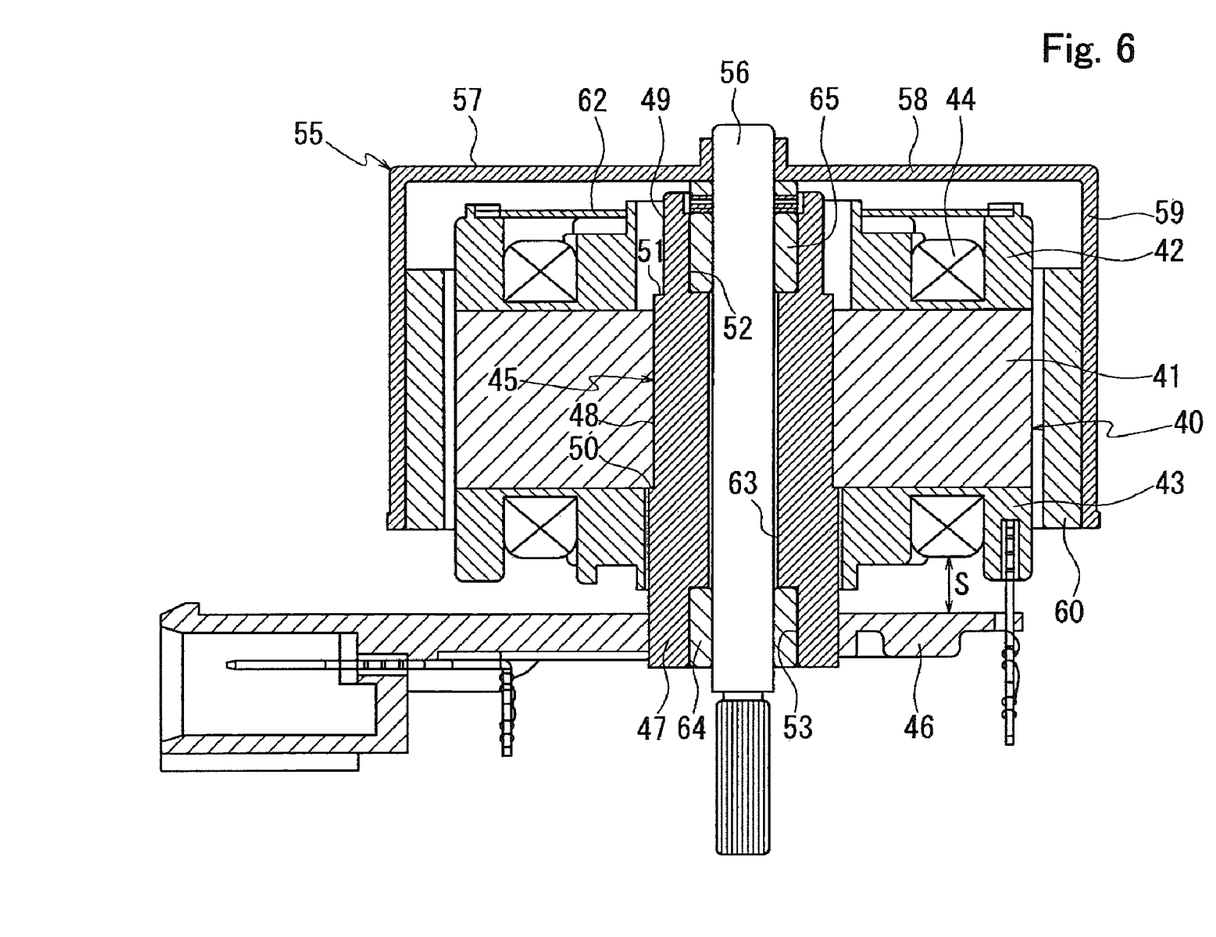
FIG. 6 is a cross-sectional view showing a conventional motor.

A conventional motor has been disclosed, for example, in Japanese Patent Laid-Open No. Hei 10-108404. This motor is structured so that a bearing holder is attached to a motor base plate, bearings are disposed on both ends of a through hole of the bearing holder, and a shaft of a rotor is supported by the bearings. However, a certain space is required to set between an exposed electric wire such as a coil and a metal member around the exposed electric wire through the legal regulations for electrical safety. Therefore, when a countermeasure is adopted for the legal regulations, a practical motor is, for example, structured as shown in FIG. 6. In this motor, a stator 40 is structured so that a stator core 41 is covered with insulator bobbins 42 and 43 from upper and lower sides in an axial direction for preventing the stator core 41 from contacting with the coil 44, and the coil 44 is wound around the insulator bobbins 42 and 43.

The bearing holder 45 is structured, from an attached side to a motor base plate 46, of a base part 47, a stator press-fitting part 48 and a small diameter part 49 formed at its tip end side. The base part 47 is provided with a larger diameter than the stator press-fitting part 48 and thus a stepped part 50 is formed between the base part 47 and the stator press-fitting part 48, and a stepped part 51 is formed between the stator press-fitting part 48 and a small diameter part 49. The stator core 41 is press-fitted to the stator press-fitting part 48 of the bearing holder 45 and the stator 40 is positioned with respect to the bearing holder 45 by means of that an end face of the stator core 41 is abutted with the stepped part 50. Certain spaces are respectively provided between the upper and lower insulator bobbins 42 and 43 and the bearing holder 45.

The bearing holder 45 is provided with a through hole 63 through which a shaft 56 of a rotor 55 is passed. The bearing holder 45 is provided with a mounting recessed part 52 in the small diameter part 49, which is a tip end part of the bearing holder 45, and an end part of the base part 47 is provided with a mounting recessed part 53. Bearings 65 and 64 are attached to the mounting recessed parts 52 and 53 to rotatably support the shaft 56. The rotor 55 includes a metal rotor case 57 with the shaft 56 as an axial center. The rotor case 57 is provided with a disk part 58 and a tube-like wall part 59 which is extended parallel to the shaft 56 from an outer circumferential edge of the disk part 58. A magnet 60 is fixed to an inner face of the tube-like wall part 59. An inner peripheral face of the magnet 60 is disposed to face an outer peripheral face of the stator 40 through a certain clearance.

A certain space "S" is set between the coil 44 and the motor base plate 46 on the basis of the legal regulations. Similarly, a certain space is required between the coil 44 and the disk part 58 of the rotor case 57 through the legal regulations. In order to surely prevent an electric wire of the coil 44 from contacting with the rotor case 57, an insulation plate 62 is attached to an end face of the insulator bobbin 42 on the upper side in the axial direction to be disposed between the coil 44 and the disk part 58 of the rotor case 57.

However, in FIG. 6, the coil 44 which is wound around the insulator bobbins 42 and 43 is exposed on an outer side and thus larger separated spaces "S" from the metal rotor case 57 and from a circuit wiring and the like on the motor base plate 46 are required through the legal regulation. In addition, the insulation plate 62 is provided between the stator 40 and the disk part 58 of the rotor case 57 and thus it is difficult that the spaces "S" between the stator 40 and the disk part 58 of the rotor case 57 and between the stator 40 and the motor base plate 46 are reduced.

Further, local potting with the use of epoxy material may be applied to a circuit wiring and the like on the motor base plate 46 to secure insulation security. However, its cure time is longer and its linear expansion coefficient under temperature environment is larger and thus it is weak against heat and cold impact and the epoxy local potting is not practical.

In addition, in order to connect the stator 40 with the bearing holder 45, the stator 40 is press-fitted to the bearing holder 45. Therefore, especially when the bearing holder 45 is made of brass or aluminum material, the stepped part 51 or an outer peripheral face of the stator press-fitting part 48 may be shaved by a hole edge of the stator core 41, which is made of iron series, at the time of press-fitting, and in this case, when shavings are remained on the stepped part 50, the stator core 41 cannot be abutted with the stepped part 50. Therefore, accurate positioning of the stator 40 to the bearing holder 45 is not attained. Further, when the shavings are dropped on the motor base plate 46, an electric short circuit may be formed.

Further, in the stator structure where the coil 44 is wound around the insulator bobbins 42 and 43 which are fitted to the stator core 41 from the upper and lower sides, when individual component precisions and accumulation of combined errors are taken into consideration, or when an attitude variation of the stator 40 due to the shaving of the stator press-fitting part 48 or remaining of the shavings is taken into consideration, a clearance between the stator core 41 and the magnet 60 of the rotor 55 cannot be set narrower and thus a size in a radial direction of the motor is not reduced. As a result, the conventional motor is difficult to reduce its size.

SUMMARY OF THE INVENTION

In view of the problems described above, at least an embodiment of the present invention may advantageously provide a motor which is capable of reducing its size with a high degree of structural accuracy while securing insulation property.

According to at least an embodiment of the present invention, there may be provided a motor including a motor base plat; a bearing holder which is provided with a through hole whose both ends hold bearings and which is vertically disposed with respect to the motor base plate, a stator which is provided with a center hole and which is fixed to an outer peripheral face of the bearing holder, and a rotor. The rotor includes a shaft which is penetrated through the through hole and supported by the bearings mounted on the bearing holder, a rotor case which is fixed to the shaft on an opposite side to the motor base plate so as to surround the stator, and a magnet which is fixed on an inner peripheral face of the rotor case so as to face an outer peripheral face of the stator. The bearing holder is provided on a motor base plate side with a stepped part protruded toward a radial direction, the stator is provided with a first resin block which is structured so that an end face on a motor base plate side of the stator core is molded with resin to cover a coil wound around the stator core, and inner peripheral faces of the stator core and the first resin block structure the center hole, and the center hole of the stator is press-fitted and fixed to the bearing holder until a lower end face of the first resin block is abutted with the stepped part.

According to this structure, a space between the coil of the stator and the motor base plate can be set narrower than a case where a coil is exposed and thus the size in the axial direction of the motor is reduced. Further, when the stator is press-fitted to the bearing holder, since the tip end in the press-fitting direction of the stator is formed with a resin block, the outer peripheral face of the bearing holder is not shaved by a hole edge of the center hole of the stator. Therefore, shavings are not remained on the stepped part and thus the resin block is directly abutted with the stepped part, in other words, the stator is surely abutted with the stepped part of the bearing holder. Accordingly, accurate positioning of the bearing holder to the stator can be obtained.

In accordance with an embodiment of the present invention, the stator is provided with a second resin block which is structured so that an end face on an opposite side to the motor base plate side of the stator core is molded with resin to cover the coil wound around the stator core. According to this structure, a space between the coil of the stator and the rotor case of the rotor can be also set narrower and thus the size in the axial direction of the motor is further reduced.

In accordance with an embodiment of the present invention, the first resin block and the second resin block are integrally connected with each other, and the first resin block and the second resin block together with the stator core structure the stator which is formed in a cylindrical outward shape. According to this structure, the first and the second resin blocks are not disengaged from the stator core.

In accordance with an embodiment of the present invention, the first resin block and the second resin block are integrally connected with each other between a plurality of salient pole parts of the stator core, and an outer peripheral face of the stator core, an outer peripheral face of the first resin block and an outer peripheral face of the second resin block are continuously connected with each other to form one cylindrical face. According to this structure, the first and the second resin blocks are not disengaged or displaced in the rotating direction from the stator core. Further, since the outer peripheral faces of the stator core, the first resin block and the second resin block are continuously connected with each other to form one cylindrical face, the stator with a high degree of shape accuracy is formed. Therefore, a space between the outer peripheral face of the stator and the magnet can be set narrower and thus the size in the radial direction in addition to the axial direction of the motor can be further reduced. In this case, it is preferable that the rotor case is formed in a bottomed cup shape which is provided with a disk part formed in a flat plate shape and press-fitted to the shaft, and a tube-like wall part formed in a cylindrical shape so as to extend in parallel with the shaft from an outer circumferential edge of the disk part and to which the magnet is fixed. In addition, a lower end face of the first resin block is formed in a flat face to be oppositely disposed to the motor base plate, and an upper end face of the second resin block is formed in a flat face to be oppositely disposed to a flat face of the disk part of the rotor case. According to this structure, a space between the coil and the disk part of the rotor and a space between the coil and the motor base plate can be set narrower.

In accordance with an embodiment of the present invention, the first resin block and the second resin block are connected with each other through an inner peripheral resin wall part which is integrated with both of the first and the second resin blocks and which covers an entire inner peripheral face of the stator core. According to this structure, all the portion which is press-fitted to the bearing holder is formed with resin and thus the press-fitting strength to the bearing holder is dispersed.

In accordance with an embodiment of the present invention, the first resin block and the second resin block are connected with each other through an outer peripheral resin wall part which is integrated with both of the first and the second resin blocks and which covers an entire outer peripheral face of the stator core. According to this structure, a space between the inner peripheral face of the rotor magnet and the outer peripheral face of the stator core can be set narrower and thus the size in the radial direction of the motor is reduced.

In accordance with an embodiment of the present invention, the resin which forms the first resin block and/or the second resin block is BMC (Bulk Molding Compound) material. According to this structure, the BMC material is resin whose base material is unsaturated polyester resin and thus its curing time is shortened in comparison with epoxy resin and it is stronger against heat and cold impact because its linear expansion coefficient is smaller.

In accordance with an embodiment of the present invention, the bearing holder is provided with a stator press-fitting part, which is press-fitted into the stator, and a base part which is formed on a motor base plate side relative to the stator press-fitting part. The base part is formed to have a larger diameter than the stator press-fitting part so that the stepped part is formed between the base part and the stator press-fitting part, and the base part is provided with a ring shaped arranging recessed part for holding one of the bearings on an inner peripheral side of the base part, and the arranging recessed part is formed at a position which is separated from the stepped part in an axial direction. According to this structure, even when a bearing is press-fitted and fixed to the mounting recessed part, the base part does not easily occur deformation and effects applied to the fixing of the stator due to press-fitting of the bearing are reduced.

In accordance with an embodiment of the present invention, the bearing holder is provided on an opposite side to the motor base plate side relative to the stator press-fitting part with a small diameter part having a smaller diameter than the stator press-fitting part, the small diameter part is provided with a ring shaped arranging recessed part for holding the other of the bearings on an inner peripheral side of the arranging recessed part, and an outer peripheral face of the small diameter part and an inner peripheral face of the stator are oppositely disposed to each other through a clearance. According to this structure, the clearance serves as a stress release portion at the time of press-fitting of the bearing and thus effects applied to the fixing of the stator due to press-fitting of the bearing are reduced.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

First Embodiment

Figure 1:
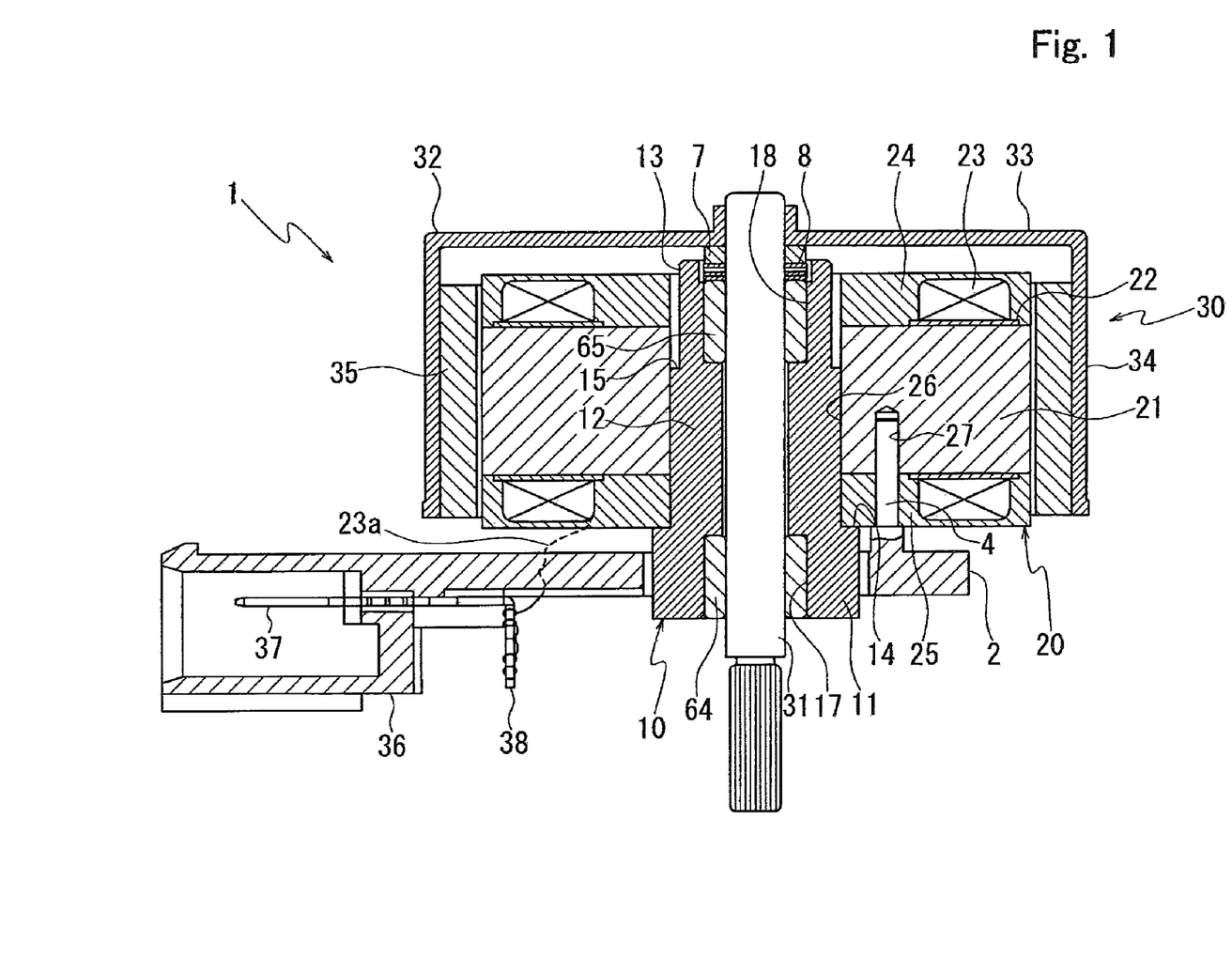
FIG. 1 is a cross-sectional view showing a motor in accordance with a first embodiment of the present invention.
Figure 2:
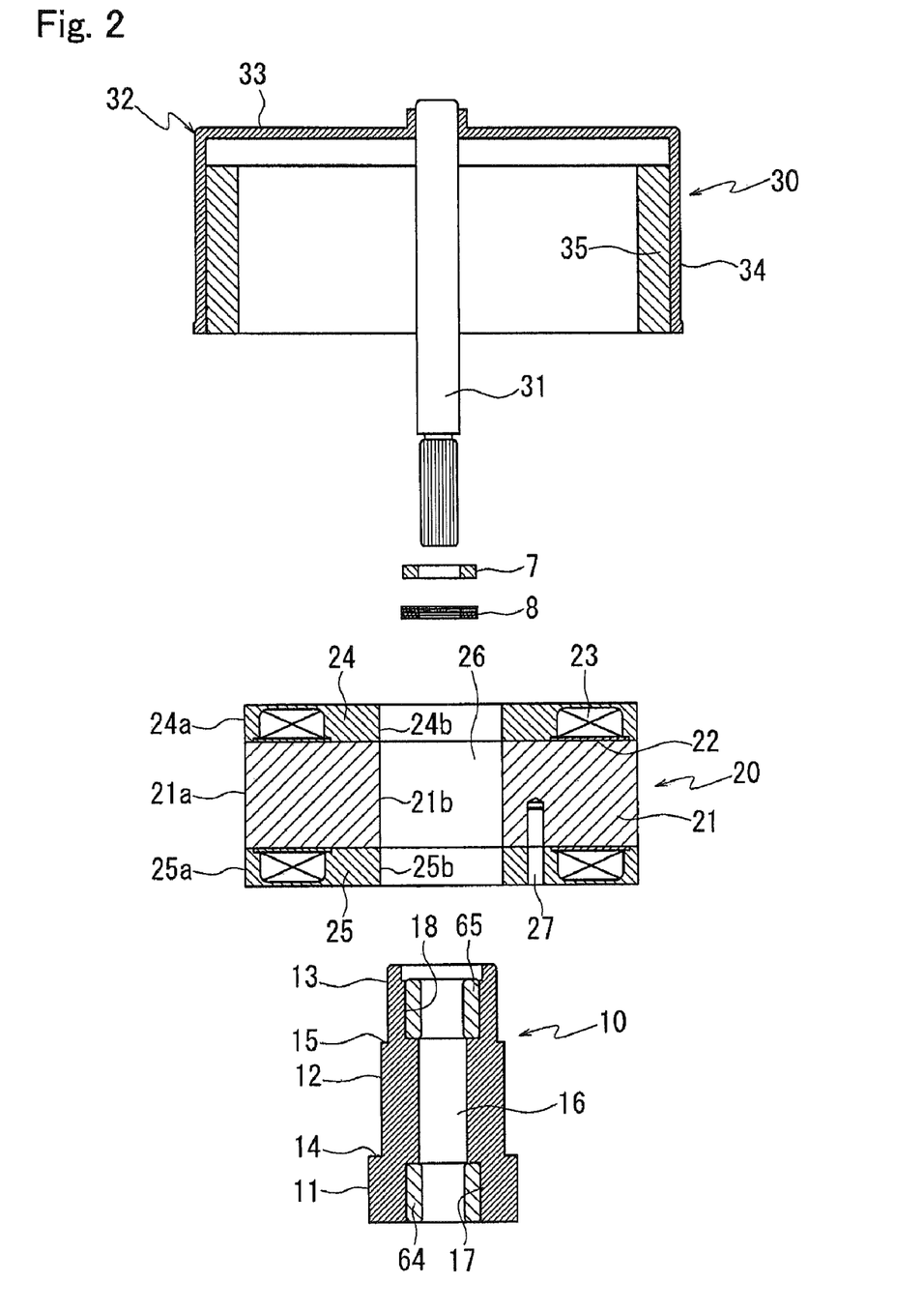
FIG. 2 is an exploded cross-sectional view showing the motor in the first embodiment.

A motor in accordance with a first embodiment of the present invention will be described in detail below with reference to the accompanying drawings. FIG. 1 is a cross-sectional view showing a motor in accordance with a first embodiment of the present invention and FIG. 2 is its exploded cross-sectional view. In FIG. 2, a motor base plate is not shown.

A motor 1 is structured so that a stator 20 is press-fitted to a bearing holder 10, a rotor 30 is supported by the bearing holder 10, and the stator 20 is fixed to a motor base plate 2. The stator 20 is structured so that a stator core 21 is covered with an insulation member 22 over a predetermined area, a coil 23 is wound around the insulation member 22, and resin blocks 24 and 25 are molded so as to cover the entire coil 23 with resin on the upper and lower sides of the stator core 21. The insulation member 22 may be a sheet-shaped member which is wound around the stator core 21 or may be a resin molded product which is formed to cover the stator core 21. Especially, a BMC (Bulk Molding Compound) resin whose base material is unsaturated polyester resin is preferably used as resin material of the resin blocks 24 and 25. In this embodiment, the resin blocks 24 and 25 are formed by utilizing one BMC material through integral molding and thus one BMC resin is referred to as the resin blocks 24 and 25. However, in order to explain their structures and functions in detail, one BMC resin member is explanatorily divided into the resin blocks 24 and 25 for description.

The coil 23 is wound around a plurality of salient pole parts extending in radial directions of the stator core 21 and thus the upper and the lower resin blocks 24 and 25 are connected with each other between the salient pole parts to be united. Outer peripheral faces 24a and 25a in the radial direction of the resin blocks 24 and 25 are smoothly connected with an outer peripheral face 21a of the stator core 21 without stepped parts, in other words, they are provided with the same outer diameter. Therefore, the outer peripheral face of the stator 20, in other words, the outer peripheral face 21a of the stator core 21 and the outer peripheral faces 24a and 25a in the radial direction of the resin blocks 24 and 25 form one cylindrical face as a whole, and the stator core 21 is sandwiched by the upper and the lower resin blocks 24 and 25.

Figure 3:
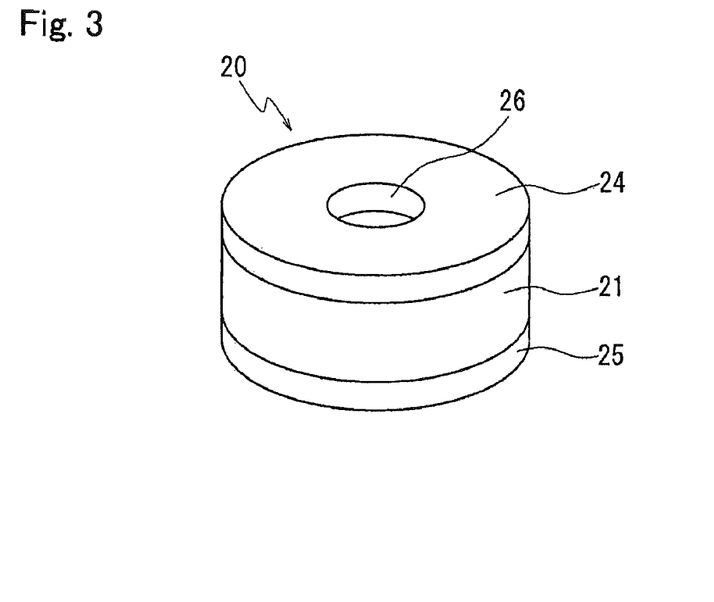
FIG. 3 is a perspective view showing an outward appearance of a stator.

Further, inner peripheral faces 24b and 25b of the resin blocks 24 and 25 are smoothly connected with an inner peripheral face 21b of the stator core 21 without stepped parts, in other words, they are provided with the same inner diameter. Therefore, the inner peripheral face of the stator 20, in other words, the inner peripheral face 21b of the stator core 21 and the inner peripheral faces 24b and 25b of the resin blocks 24 and 25 form one inner peripheral face as a whole and thus a cylindrical center hole 26 of the stator 20 is structured in a state that the stator core 21 is sandwiched by the upper and the lower resin blocks 24 and 25. In addition, the coil 23 is completely buried in the inside of the resin blocks 24 and 25 and, therefore, an upper end face of the resin block 24 and the lower end face of the resin block 25 are formed in flat faces. In this manner, as shown in FIG. 3, the stator 20 is formed in one cylindrical shape. An under face of the stator 20 is formed with three holes 27 in a circumferential direction around the center hole 26 with arbitrary intervals, for example, with an equal interval, from the resin block 25 into the stator core 21 respectively.

The stator 20 in which the stator core 21, the coil 23 and the resin blocks 24 and 25 are integrated with each other as described above is fixed to the bearing holder 10 by means of that the center hole 26 of the stator 20 is press-fitted to the bearing holder 10. The bearing holder 10 is structured of a base part 11, a stator press-fitting part 12 and a small diameter part 13 at its tip end portion. The base part 11 is formed to have a larger diameter than the stator press-fitting part 12 and a stepped part 14 is formed between the base part 11 and the stator press-fitting part 12. Further, the stator press-fitting part 12 is formed to have a larger diameter than the small diameter part 13 and a stepped part 15 is formed between the stator press-fitting part 12 and the small diameter part 13. In other words, an outer peripheral face of the bearing holder 10 is formed in a cylindrical shape having two stepped parts 14 and 15.

The bearing holder 10 is formed with a through hole 16 through which a shaft 31 of the rotor 30 is passed. An inner peripheral face of the base part 11 is formed in a larger diameter than the through hole 16 and a cylindrical shaped mounting recessed part 17 is provided for holding a bearing 64 which supports one end side of the shaft 31. An inner peripheral face of the small diameter part 13 on the tip end side is formed in a larger diameter than the through hole 16 and a cylindrical shaped mounting recessed part 18 is provided for holding a bearing 65 which supports the other end side of the shaft 31. In other words, the mounting recessed parts 17 and 18 are formed so as not to overlap the stator press-fitting part 12 in the axial direction and to be slightly separated from the positions of the stepped parts 14 and 15 in the axial direction respectively which are located at both ends of the stator press-fitting part 12.

The center hole 26 of the stator 20 is fitted to the small diameter part 13 of bearing holder 10 from the resin block 25 side to mount toward the stator press-fitting part 12. The stator press-fitting part 12 is inserted into the center hole 26 of the stator 20 until the lower end face of the resin block 25 is abutted with the stepped part 14 which is formed between the base part 11 and the stator press-fitting part 12. In this state, that stator 20 is press-fitted with the stator press-fitting part 12 and the bearing holder 10 and the stator 20 are mutually positioned to each other in the axial direction. In this case, the stator press-fitting part 12 is firstly brought into contact with a hole edge of the inner peripheral face 25b of the resin block 25 of the stator 20 and thus an edge of the stepped part 15 and an outer peripheral face of the stator press-fitting part 12 are prevented from being shaved and shavings are not formed.

In accordance with an embodiment of the present invention, although not shown, a longitudinal groove continuing in the axial direction is formed on the inner peripheral face of the center hole 26 of the stator 20, i.e., on the inner peripheral face 21b of the stator core 21 and the inner peripheral faces 24b and 25b of the upper and the lower resin blocks 24 and 25. On the other hand, the stator press-fitting part 12 of the bearing holder 10 is formed with a longitudinal rib continuing in the axial direction so as to correspond to the longitudinal groove.

Therefore, when the longitudinal groove of the stator 20 is press-fitted to the longitudinal rib of the bearing holder 10, the stator 20 and the bearing holder 10 are positioned in the circumferential direction (rotating direction) to prevent the stator 20 from turning with respect to the bearing holder 10. In accordance with an embodiment of the present invention, a rib may be formed on the center hole 26 of the stator 20 and a longitudinal groove is formed on the stator press-fitting part 12 of the bearing holder 10.

Figure 4:
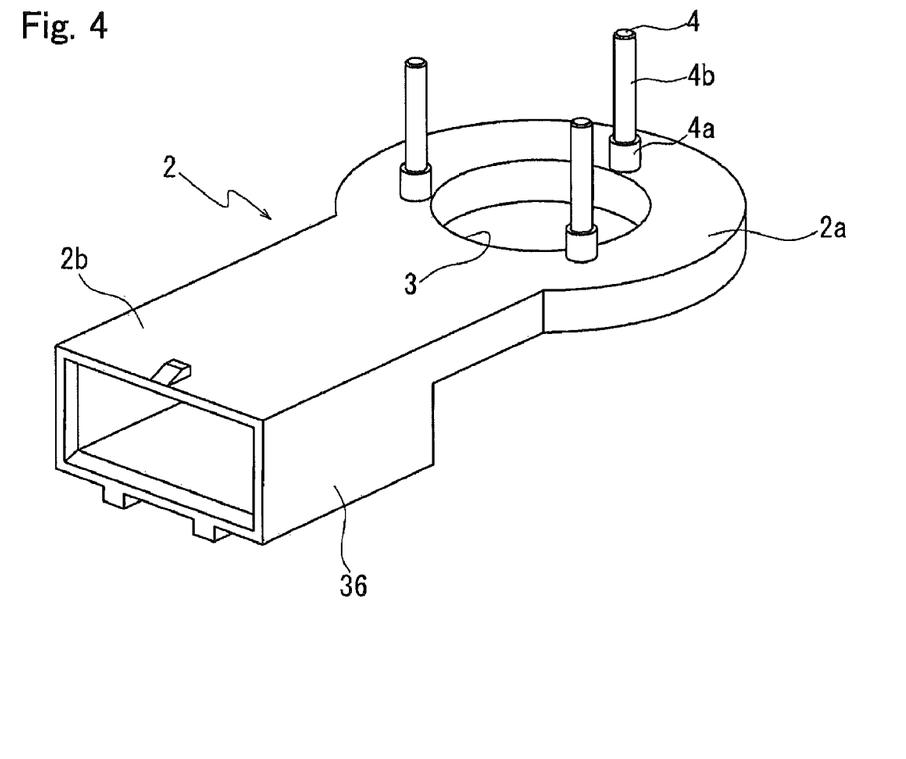
FIG. 4 is an enlarged perspective view showing a motor base plate.

The motor base plate 2 is made of resin and structured of a stator connecting part 2a and a connector part 2b. As shown in FIG. 4, the stator connecting part 2a is provided with a circular hole 3 for penetrating the base part 11 of the bearing holder 10 and three pins 4 along an edge of the hole 3 in the circumferential direction with an equal interval. The pin 4 which is integrally molded with the stator connecting part 2a is structured of a large diameter part 4a on its root side and a small diameter part 4b which is long and thin and formed on a tip end side of the large diameter part 4a. The respective pins 4 are located so as to correspond to the holes 27 of the stator 20. While penetrating the base part 11 of the bearing holder 10 through the hole 3 of the stator connecting part 2a, the small diameter parts 4b of the pins 4 are press-fitted into the holes 27 of the stator 20 until stepped parts formed between the small diameter part 4b and the large diameter part 4a are abutted with the resin block 25. As a result, the motor base plate 2 is connected with the stator 20.

In this manner, the stator connecting part 2a is disposed in a plane perpendicular to the axial direction of the stator 20. In other words, the bearing holder 10 is disposed to be perpendicular to the motor base plate 2 through the stator 20. In accordance with an embodiment of the present invention, it is preferable that the hole 27 of the stator 20 is formed so that the pin 4 is press-fitted into both of the resin block 25 and stator core 21. However, the pin 4 may be press-fitted into only the stator core 21.

The connector part 2b is provided with a socket part 36 which is opened in a direction extending along a flat face of the stator connecting part 2a. Connector terminals 37 are provided so as to protrude in the inside of the socket part 36 and the connector terminals 37 are extended from the socket part 36 under the stator connecting part 2a and bent downward in a "L" shape. A portion of the connector terminal 37 which is bent in the "L" shape is a connecting terminal 38 with which an electric wire 23a drawn out from the coil 23 is connected. The electric wire 23a is arranged so as to be drawn out from the resin block 25 at positions near the connecting terminals 38 of the motor base plate 2 at the time of molding of the resin blocks 24 and 25.

The rotor 30 includes a shaft 31 and a metal rotor case 32 with the shaft 31 as an axial center. The rotor case 32 is formed in a bottomed cup shape which is provided with a disk part 33, which is formed in a flat plate shape and is press-fitted to the shaft 31, and a tube-like wall part 34 in a cylindrical shape which is extended in parallel with the shaft 31 from an outer circumferential edge of the disk part 33. A magnet 35 is fixed to an inner face of the tube-like wall part 34 with an adhesive or the like.

As shown in FIG. 1, in the state that the resin block 25 is abutted with the stepped part 14, the inner peripheral face of the center hole 26 of the stator 20, in other words, the inner peripheral face 25b of the resin block 25 and a portion more than half of the inner peripheral face 21b of the stator core 21 are press-fitted to the outer peripheral face of the stator press-fitting part 12. Further, the inner peripheral face 24b of the resin block 24 and a remaining part of the inner peripheral face 21b of the stator core 21 are oppositely disposed to the outer peripheral face of the small diameter part 13 through a clearance. The shaft 31 of the rotor 30 is inserted from the upper side into the bearing 65, the through hole 16 and the bearing 64 of the bearing holder 10 and, as a result, the tube-like wall part 34 of the rotor case 32 is disposed to surround the outer peripheral face of the stator 20. In this state, the inner peripheral face of the magnet 35 and the outer peripheral face of the stator core 21 are oppositely disposed with a predetermined clearance therebetween.

A first thrust washer 7 and a second thrust washer 8 are provided between the disk part 33 of the rotor 30 and the bearing 65. The first thrust washer 7 is fixed to the shaft 31 by press-fitting. The second thrust washer 8 is loosely fitted to the shaft 31 for reducing abrasion between the first thrust washer 7 and the bearing 65. In this state, the magnet 35 fixed to the inner face of the tube-like wall part 34 of the rotor 30 is oppositely disposed to the outer peripheral face of the stator core 21 and is also oppositely disposed to most in height directions of the resin blocks 24 and 25 on the upper and the lower sides through the same clearance.

In this embodiment, the coil 23 is molded within the resin block 24 so as not to expose in a space between the coil 23 and the disk part 33 of the rotor 30. Therefore, an upper side flat face of the resin block 24, i.e., its upper end face is oppositely disposed to a flat face of the disk part 33 of the rotor 30. Similarly, the coil 23 is molded within the resin block 25 so as not to expose in a space between the coil 23 and the motor base plate 2. Therefore, a lower side flat face of the resin block 25, i.e., its lower end face is oppositely disposed to an upper flat face of the motor base plate 2. Therefore, spaces between the coil 23 and the disk part 33 of the rotor 30 and between the coil 23 and the motor base plate 2 can be set narrower in comparison with the conventional motor.

In the embodiment of the present invention, the resin block 25 corresponds to the first resin block and the resin block 24 corresponds to the second resin block. The stepped part 14 corresponds to the stepped part in the embodiment of the present invention.

As described above, the motor 1 in this embodiment is structured so that the bearing holder 10 is provided on the motor base plate 2 side with the stepped part 14 protruded in the radial direction, the stator 20 is provided with the resin block 25, which covers the coil 23 wound around the stator core 21, and the end face on the motor base plate 2 side of the stator core 21 is molded with resin structuring the resin block 25 to be formed in a flat face. In addition, the inner peripheral face 21b of the stator core 21 and the inner peripheral face 25b of the resin block 25 structure the center hole 26 of the stator 20 in a continuous state without a stepped part, and the center hole 26 is press-fitted to the bearing holder 10 until the resin block 25 is abutted with the stepped part 14. Therefore, a space between the coil 23 of the stator 20 and the motor base plate 2 can be made narrower in comparison with a case that the coil 23 is exposed and thus the size in the axial direction of the motor 1 can be reduced.

Further, when the stator 20 is to be press-fitted to the bearing holder 10, the tip end in the press-fitting direction of the stator 20 is the resin block 25 which is molded with resin and thus the outer peripheral face of the bearing holder 10 is not shaved by the hole edge of the center hole 26. Therefore, shavings are not remained on the stepped part 14 and thus the resin block 25 is directly abutted with the stepped part 14, in other words, the stator 20 is abutted with the stepped part 14 of the bearing holder 10. Accordingly, accurate positioning of the bearing holder 10 and the stator 20 to each other can be obtained.

In addition, the stator 20 is provided with the resin block 24, which is molded on the end face on the opposite side to the motor base plate 2 with resin and is formed in a flat face, and thus a space between the coil 23 of the stator 20 and the rotor case 32 (disk part 33) of the rotor 30 can be also set narrower and, as a result, the size in the axial direction of the motor 1 is further reduced. Further, in addition to a shorter length of the bearing holder 10, the stator core 21 and the coil 23 are molded in the resin blocks 24 and 25 and thus the sizes in the axial direction of the resin blocks 24 and 25 can be also reduced in comparison with the insulator bobbins which are superposed on the stator core.

Further, although a roughly half of the bearing 65 is overlapped with the upper side of the stator core 21 in the axial direction, the stator press-fitting part 12 is not overlapped with the mounting recessed part 18 for holding the bearing 65. In other words, the mounting recessed part 18 is separated from the position of the stepped part 15 in the axial direction. In addition, the inner peripheral face 21b of the resin block 24 and an upper portion of the inner peripheral face 21b of the stator core 21 are oppositely disposed to the outer peripheral face of the small diameter part 13 where the mounting recessed part 18 is formed through a clearance. Therefore, even when the stator 20 is press-fitted and fixed to the stator press-fitting part 12 of the bearing holder 10, deformation does not occur in the bearing holder 10 (especially, in the small diameter part 13) and thus the bearing 65 held by the mounting recessed part 18 is not affected. In addition, even when the bearing 65 is press-fitted and fixed to the mounting recessed part 18, the clearance is provided between the outer peripheral face of the small diameter part 13 where the mounting recessed part 18 is formed and the inner peripheral face of the stator core 21. Therefore, the clearance serves as a stress release portion at the time of press-fitting of the bearing 65 and thus the press-fitting of the bearing 65 does not affect fixing of the stator 20.

In addition, the lower end part of the stator 20 which is press-fitted is the resin block 25. Therefore, even when the stepped part 14 with which the stator 20 is abutted is set to be at the position near the mounting recessed part 17 in the axial direction, the resin block 25 is deformable and thus, the bearing holder 10 (especially, the base part 11) is not deformed even when the stator 20 is press-fitted and fixed to the stator press-fitting part 12 of the bearing holder 10 and the bearing 64 held by the mounting recessed part 17 is not affected. Further, in this embodiment, the mounting recessed part 17 is formed in the base part 11 having a larger diameter and provided at the position separated from the stepped part 14 in the axial direction. Therefore, even when the bearing 64 is press-fitted and fixed to the mounting recessed part 17, the base part 11 is not easily deformed and thus the press-fitting of the bearing 64 does not affect fixing of the stator 20.

Further, as described above, the bearings 64 and 65 are fixed to the mounting recessed parts 17 and 18 without being affected by assembling of other members. Therefore, the rotor 30 supported by the bearings 64 and 65 does not incline with respect to the stator 20 and excessive sliding loss does not occur.

Further, the resin blocks 24 and 25 are integrally connected with each other between a plurality of the salient pole parts of the stator core 21 and thus the resin blocks 24 and 25 are not disengaged from the stator core 21 and are not displaced from the stator core 21 in the rotating direction. Similarly, the resin blocks 24 and 25, the stator core 21 and the coil 23 are integrally molded with each other, and the outer peripheral face 21a of the stator core 21 and the outer peripheral faces 24a and 25b in the radial direction of the resin blocks 24 and 25 are continuously connected with each other without a stepped part so that the outward shape of the stator 20 is cylindrical as a whole and thus the stator 20 can be formed with a high degree of shape accuracy. Therefore, a clearance of the outer peripheral face of the stator 20 and the magnet 35 can be made narrower and thus, in addition to downsizing in the axial direction of the motor 1, the size in the radial direction can be reduced.

Further, since the resin blocks 24 and 25 are formed of BMC resin. Therefore, although in the potting of epoxy, for example, its cure time is one or two hours and its linear expansion coefficient is (from 3 to 7)×$10^{-5}$/° C., in the BMC resin, its cure time is 90-300 sec and thus its process time is shortened, and its linear expansion coefficient becomes smaller, i.e., (from 1 to 4)×$10^{-5}$/° C. and thus it is stronger against heat and cold impact.

Second Embodiment

Figure 5:
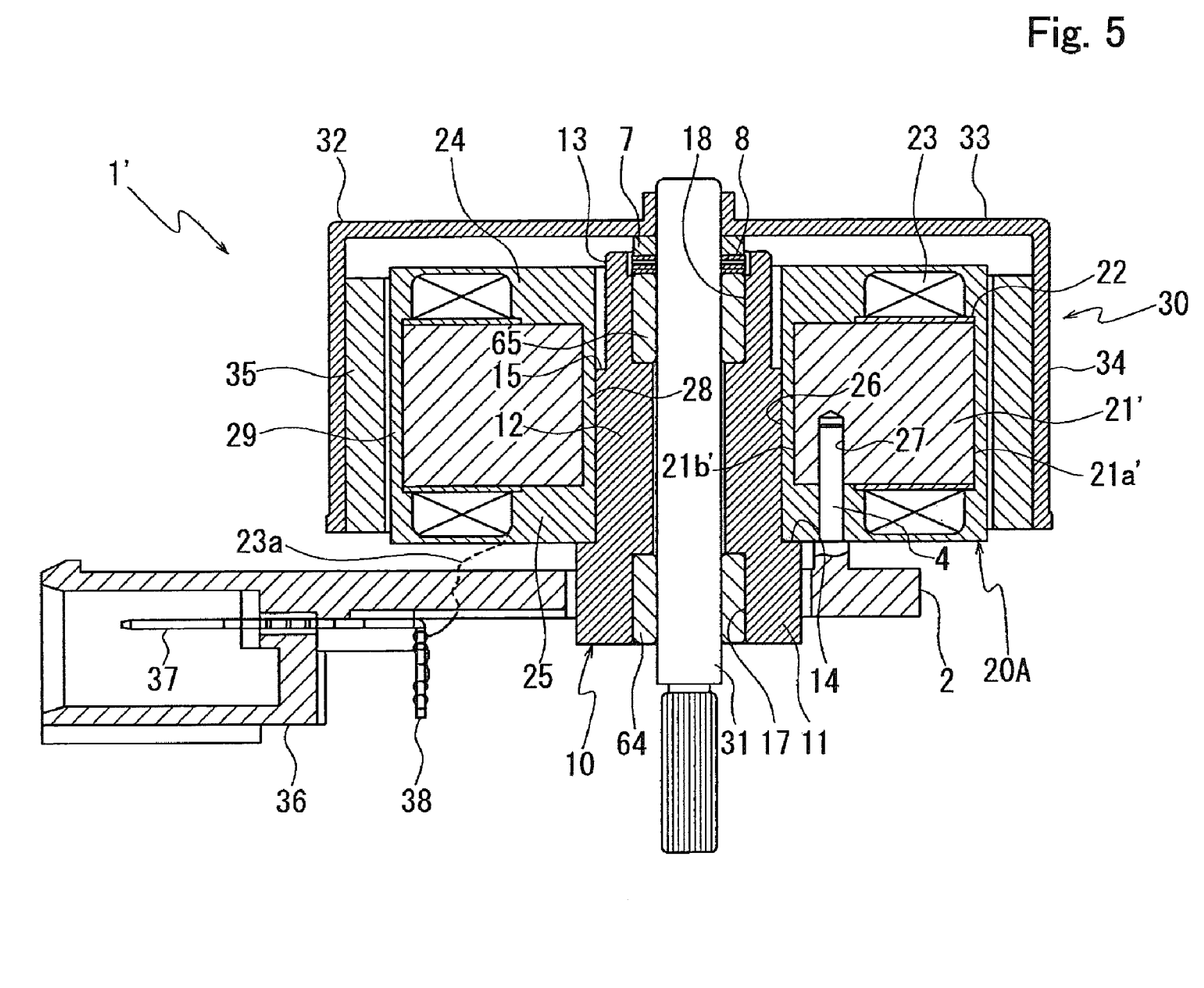
FIG. 5 is a cross-sectional view showing a motor in accordance with a second embodiment of the present invention.

Next, a motor in accordance with a second embodiment of the present invention will be described below. In the second embodiment, a stator structure is different from the structure in the first embodiment. FIG. 5 is a cross-sectional view showing a motor in accordance with a second embodiment of the present invention. A basic structure in the second embodiment is similar to that in the first embodiment and thus the same notational symbols are used in the same portions and their descriptions are omitted. Also in the second embodiment, the resin block 25 corresponds to the first resin block and the resin block 24 corresponds to the second resin block. The stepped part 14 corresponds to the stepped part in the second embodiment.

The stator 20 in the first embodiment is structured so that the stator core 21 is molded so as to be sandwiched by the upper and the lower resin blocks 24 and 25 and so that the inner peripheral face and the outer peripheral face of the stator core 21 are exposed from the resin blocks 24 and 25. However, in a motor 1' in accordance with the second embodiment, the stator 20A is structured so that all faces of the stator core 21', in other words, an outer peripheral face 21a' and an inner peripheral face 21b' of the stator core 21' are covered with BMC resin in addition to the upper and the lower end faces in the axial direction of the stator core 21'. In this manner, an inner peripheral face and an outer peripheral face of the stator 20A are formed with an inner peripheral resin wall part 28 and an outer peripheral resin wall part 29 which are continuously formed in an axial direction so as to be integrated with the resin blocks 24 and 25.

In accordance with this embodiment, the stator core 21' is completely buried within resin and the outward appearance of the stator 20A is a cylindrical resin block whose upper and lower end faces are flat faces. As a result, the upper and the lower end faces of the stator 20A and its outer peripheral face and the inner peripheral face of its center hole 26 are formed with a high degree of dimensional accuracy by using dies for resin mold. Therefore, in comparison with the first embodiment, a space between the upper end face of the stator 20A (upper end face of the resin block 24) and the disk part 33 of the rotor 30, a space between the lower end face of the stator 20A (lower end face of the resin block 25) and the motor base plate 2, and a space between the outer peripheral face of the stator 20A and the magnet 35 can be set in further narrower respectively and thus the sizes in the axial direction and the radial direction of the motor 1' can be further reduced.

Further, the inner peripheral face of the center hole 26 of the stator 20A is the inner peripheral resin wall part 28 over all the length in the axial direction of the stator core 21'. Therefore, in comparison with a case that a concentrated loading may be locally applied when the stator core 21' is directly press-fitted to the bearing holder 10, in this embodiment, when the stator 20A is press-fitted to the bearing holder 10, a locally applied compressive force to the stator press-fitting part 12 is relaxed and dispersed. Therefore, even when a wall thickness of the stator press-fitting part 12 of the bearing holder 10 is made thinner, in other words, even when the outer diameter of the stator press-fitting part 12 is made smaller, the mounting recessed parts 17 and 18 of the bearings 64 and 65 are not deformed and thus the size in the radial direction of the motor 1' can be further reduced. Further, since the stator core 21' is completely buried within the resin, occurrence of rust is prevented and heat generation loss is reduced by heat radiation effect due to characteristics of BMC material. In addition, noise due to electromagnetic vibration of the stator core 21' is also reduced.

Another Embodiments

In the embodiments described above, the rotor is mounted on the fixed side, i.e., on the motor base plate 2 by means of that the pins 4 provided on the motor base plate 2 are press-fitted into the holes 27 of the stator 21 (21'). However, the present invention is not limited to this structure. For example, the motor base plate may be fixed to the base part of the bearing holder, or the motor base plate may be integrally molded with the bearing holder.

Further, a circuit wiring portion on the motor base plate 2 or the entire motor base plate 2 may be covered with resin except the connecting terminals 38 and connected portions of the electric wire 23a. In this case, electrical safety can be further improved. Further, in the second embodiment, the stator 20A is provided with both of the inner peripheral resin wall part 28 and the outer peripheral resin wall part 29 and the stator core 21' is completely buried within the resin. However, only one of the inner peripheral resin wall part 28 and the outer peripheral resin wall part 29 may be provided depending on specification's demands.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not, restrictive, the scope of the invention being indicated by the appended claims, rather than the foregoing description, and all changes which come within the meaning and range of equivalency of the claims are therefore intended to be embraced therein.

What is claimed is:

1. A motor comprising:
   a motor base plate;
   a bearing holder which is provided with a through hole whose both ends hold bearings and which is vertically disposed with respect to the motor base plate;
   a stator which is provided with a center hole and which is fixed to an outer peripheral face of the bearing holder; and
   a rotor comprising:
   a shaft which is penetrated through the through hole and supported by the bearings;
   a rotor case which is fixed to the shaft on a side of the shaft opposite to the motor base plate; and
   a magnet which is fixed on an inner peripheral face of the rotor case so as to face an outer peripheral face of the stator;
   wherein the bearing holder is provided on a motor base plate side with a stepped part protruded toward a radial direction;
   wherein the stator is provided with a first resin block which is structured so that an end face on a motor base plate side of a stator core is molded with resin to cover a coil that is wound around the stator core and a second resin block which is structured so that an end face on an opposite side to the motor base plate side of the stator core is molded with the resin to cover the coil that is wound around the stator core, and the first resin block and the second resin block are integrally connected with each other;
   inner peripheral faces of the stator core and the first resin block structure the center hole, and the center hole of the stator is press-fitted and fixed to the bearing holder until an end face of the first resin block is abutted with the stepped part;
   the motor base plate is provided with a plurality of pins having a stepped part for connecting the motor base plate with the stator; and
   an end face of the first resin block is formed in a flat face to be oppositely disposed to the motor base plate and the end face of the first resin block is abutted with the stepped parts of the plurality of pins so that the end face of the first resin block is separated from the motor base plate.

2. The motor according to claim 1, wherein the first resin block and the second resin block together with the stator core structure the stator which is formed in a cylindrical shape.

3. The motor according to claim 2, wherein the first resin block and the second resin block are integrally connected with each other between a plurality of salient pole parts of the stator core, and an outer peripheral face of the stator core, an outer peripheral face of the first resin block and an outer peripheral face of the second resin block are continuously connected with each other to form one cylindrical face.

4. The motor according to claim 3, wherein
   the rotor case is formed in a bottomed cup shape which is provided with a disk part that is formed in a flat plate shape and that is press-fitted to the shaft, and a tube-like wall part formed in a cylindrical shape so as to extend in parallel with the shaft from an outer circumferential edge of the disk part and to which the magnet is fixed,
   an end face of the second resin block is formed in a flat face to be oppositely disposed to a flat face of the disk part of the rotor case.

5. The motor according to claim 4, wherein resin of the first resin block and the second resin block is Bulk Molding Compound.

6. The motor according to claim 2, wherein the first resin block and the second resin block are connected with each other through an inner peripheral resin wall part which is integrated with the first and the second resin blocks and which covers an entire inner peripheral face of the stator core.

7. The motor according to claim 2, wherein the first resin block and the second resin block are connected with each other through an outer peripheral resin wall part which is integrated with the first and the second resin blocks and which covers an entire outer peripheral face of the stator core.

8. The motor according to claim 1, wherein resin of the first resin block is Bulk Molding Compound.

9. The motor according to claim 1, wherein
the bearing holder is provided with a stator press-fitting part which is press-fitted into the stator and a base part which is formed on a motor base plate side relative to the stator press-fitting part,
the base part is formed to have a larger diameter than the stator press-fitting part so that the stepped part is formed between the base part and the stator press-fitting part, and the base part is provided with a ring shaped arranging recessed part for holding one of the bearings on an inner peripheral side of the base part, and
the arranging recessed part is formed at a position which is separated from the stepped part in an axial direction.

10. The motor according to claim 9, wherein
the bearing holder is provided on an opposite side to the motor base plate side relative to the stator press-fitting part with a small diameter part having a smaller diameter than the stator press-fitting part,
the small diameter part is provided with a ring shaped arranging recessed part for holding another of the bearings on an inner peripheral side of the arranging recessed part, and an outer peripheral face of the small diameter part and an inner peripheral face of the stator are oppositely disposed to each other through a clearance.

11. The motor according to claim 1, wherein the each of the plurality of pins comprises a large diameter part on a root side and a small diameter part that is long and thin relative to the large diameter part and formed on a tip end side of the of the large diameter part; and
the small diameter part of each of the plurality of pins is press-fitted into holes of the stator until the stepped parts of the plurality of pins are abutted with the first resin block.

* * * * *